(12) United States Patent
Vierimaa

(10) Patent No.: US 11,825,320 B2
(45) Date of Patent: Nov. 21, 2023

(54) APPARATUS, SYSTEM AND METHOD FOR TESTING RADIO EQUIPMENT

(71) Applicant: Siemens Industry Software Inc., Plano, TX (US)

(72) Inventor: Kari Vierimaa, Kempele (FI)

(73) Assignee: Siemens Industry Software Inc., Plano, TX (US)

( * ) Notice: Subject to any disclaimer, the term of this patent is extended or adjusted under 35 U.S.C. 154(b) by 335 days.

(21) Appl. No.: 17/283,162

(22) PCT Filed: Oct. 10, 2019

(86) PCT No.: PCT/US2019/055623
§ 371 (c)(1),
(2) Date: Apr. 6, 2021

(87) PCT Pub. No.: WO2020/077086
PCT Pub. Date: Apr. 16, 2020

(65) Prior Publication Data
US 2021/0345142 A1  Nov. 4, 2021

(30) Foreign Application Priority Data
Oct. 12, 2018 (EP) .................................... 18200162

(51) Int. Cl.
*H04W 24/08* (2009.01)
(52) U.S. Cl.
CPC .................................. *H04W 24/08* (2013.01)
(58) Field of Classification Search
CPC ...... H04W 24/08; H04W 24/06; H04W 24/00
See application file for complete search history.

(56) References Cited

U.S. PATENT DOCUMENTS

| | | | |
|---|---|---|---|
| 8,964,791 B2 | 2/2015 | Vu et al. | |
| 10,454,594 B2* | 10/2019 | Liang | H04B 17/3912 |
| 11,323,176 B2* | 5/2022 | Vaez-Ghaemi | G01M 11/3109 |
| 2018/0070254 A1* | 3/2018 | Hannan | H04W 52/24 |
| 2022/0029667 A1* | 1/2022 | Dhananjay | H04B 7/10 |
| 2022/0078643 A1* | 3/2022 | Vierimaa | H04B 17/15 |
| 2022/0109498 A1* | 4/2022 | Vaez-Ghaemi | G02B 6/4284 |
| 2023/0017470 A1* | 1/2023 | Niiranen | H04L 1/0002 |

FOREIGN PATENT DOCUMENTS

WO   2017143297 A1   8/2017

OTHER PUBLICATIONS

European Search Report for European Application No. 18200162.8-1214 dated Mar. 20, 2019.

(Continued)

*Primary Examiner* — Abdullahi Ahmed
(74) *Attorney, Agent, or Firm* — Lempia Summerfield Katz LLC

(57) ABSTRACT

A method of testing radio equipment is disclosed herein. The method includes: receiving, by way of a radio channel test apparatus, a baseband signal representing I/Q data of one or more radio channels; processing, by way of the radio channel test apparatus, the baseband signal representing I/Q data according to one or more radio channel models; and transmitting, by way of the radio channel test apparatus, the processed baseband data representing I/Q data to a radio equipment under test.

19 Claims, 12 Drawing Sheets

(56) References Cited

OTHER PUBLICATIONS

International Preliminary Report on Patentability for International Patent Application PCT/US2019/055623 dated Feb. 2, 2021.
International Search Report and the Written Opinion for International Patent Application PCT/US2019/055623 dated Nov. 29, 2019.

* cited by examiner

FIG 3
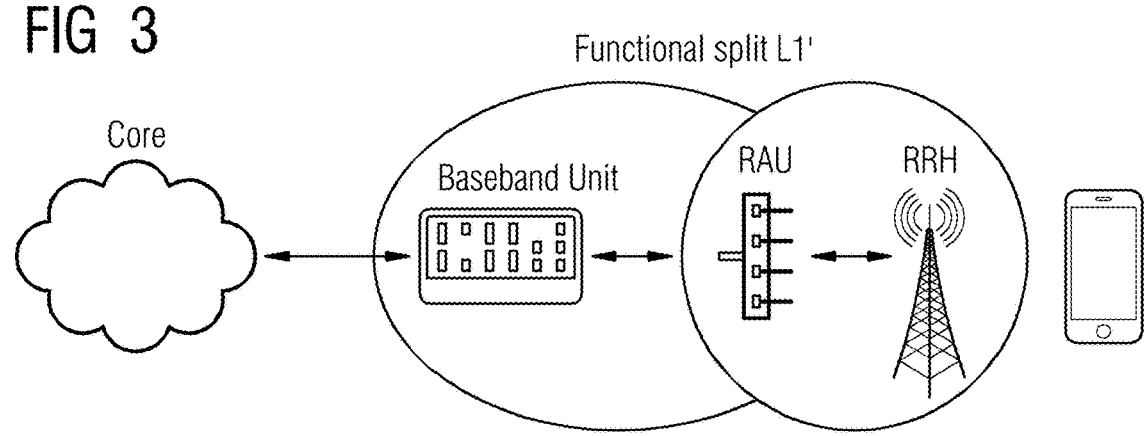
FIG 4a
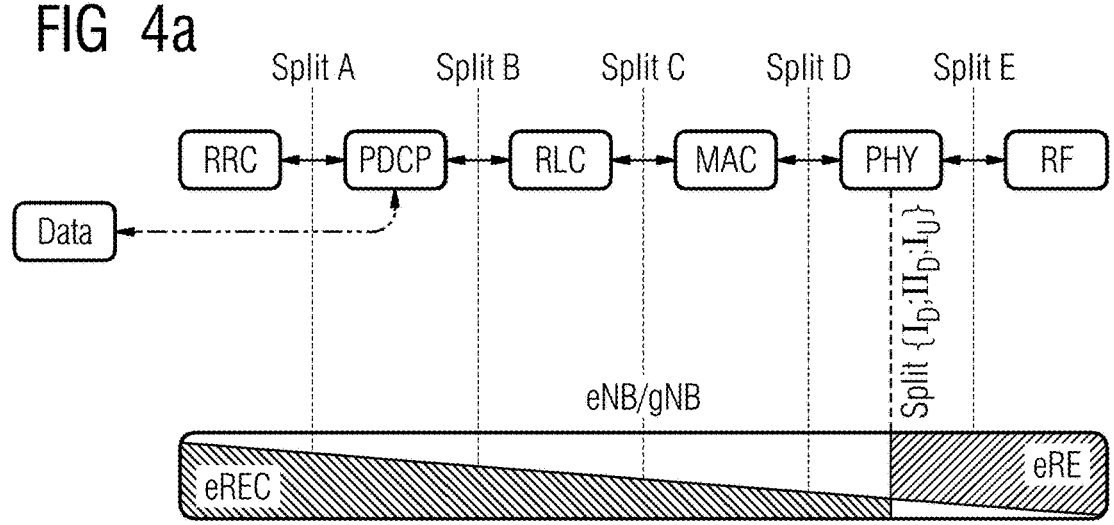
FIG 4b
| Split | Fronthaul capacity needs | Fronthaul latency requirement |
|---|---|---|
| A | Low, Scales with # MIMO layers | Relaxed |
| B | Low, Scales with # MIMO layers | Relaxed |
| C | Low, Scales with # MIMO layers | Relaxed |
| D | Low, Scales with # MIMO layers | Very Strict |
| E | Very High, Scales with # antenna ports | Very Strict |
| $\{I_D; II_D; I_U\}$ | See section 6.1.1 | Very Strict |

FIG 23

Processing, by way of the radio channel test apparatus, baseband data received via the first section and received via the second section of the fronthaul link in parallel or in a cascaded manner — S21

FIG 24

Operating the radio channel test apparatus in a fronthaul communication link between a physical or virtual radio equipment control and one or more physical or virtual radio equipments — S22

FIG 25

Processing, by way of the radio channel test apparatus, the baseband signal comprising I/Q data of each of multiple radio channels according to a radio channel model associated with each of the radio channels — S23

Transmitting, by way of the radio channel test apparatus, the processed baseband signal comprising I/Q data via the fronthaul communication link — S24

FIG 26

Processing, by way of the radio channel test apparatus, the baseband data of each of the multiple radio channels in parallel or in a cascaded manner —S25

FIG 27

Processing, by way of the radio channel test apparatus, baseband signal comprising I/Q data of each of the multiple radio channels, the radio channel test apparatus comprising consecutively interconnected devices for processing the baseband signal comprising I/Q data of the multiple radio channels, wherein each device processes baseband signal of at least one radio channel —S26

APPARATUS, SYSTEM AND METHOD FOR TESTING RADIO EQUIPMENT

The present patent document is a § 371 nationalization of PCT Application Serial No. PCT/US2019/055623, filed Oct. 10, 2019, designating the United States, which is hereby incorporated by reference, and this patent document also claims the benefit of European Patent Application No. 18200162.8, filed Oct. 12, 2018, which is also hereby incorporated by reference.

TECHNOLOGICAL FIELD

The disclosure relates to the field of radio communication systems, and more specifically to testing of radio equipment.

BACKGROUND

SIEMENS® is developing innovative test systems for ASIC and FPGA verification and validation in the areas of simulation, hardware emulation, Field Programmable Gate Array (FPGA) prototyping, and real time (post-silicon, manufacturing) environments. Such test systems may include one or more test apparatus that may be utilized in a variety of high-tech fields, ranging from cellular base stations to the automotive industry. For example, a radio equipment test system or test apparatus, (e.g., from the X-Step product line), allows stimulation and tracing of all the digital interfaces in a modern radio equipment such as a radio equipment control (REC) and/or radio equipment (RE) modules (also known as baseband unit, BBU, and remote radio head, RRH, respectively). The digital interface protocols supported by such a test apparatus may include JESD204B, CPRI, OBSAI RP3, and 10G Ethernet. A test apparatus may further include in register-transfer level (RTL) simulation and hardware emulation and may also work with FPGA prototyping, real-time post-silicon board debugging and final product testing. The test apparatus may cover every phase in a radio base station product development cycle, ranging all the way from very first RTL simulations to post-production. The same tests may then be re-used in every phase of the product development cycle. Also, thanks to the parameterized test case building block architecture, the porting of test cases from one project to another is facilitated.

SUMMARY

Implementation of 5G networks will change the technology landscape for all the concerned stakeholders from equipment manufacturers to telecom operators. The radio interface for example is switching from analog over to digital which means that traditional ways of developing and testing the equipment will no longer be possible. Also, the network set-up is becoming more complex. When, for example, a 3G network used six antennas and a 4G network used 36 antennas, then a 5G system may have more than 200 antennas.

It is thus an object of the present disclosure to improve testing of radio equipment.

The scope of the present disclosure is defined solely by the appended claims and is not affected to any degree by the statements within this summary. The present embodiments may obviate one or more of the drawbacks or limitations in the related art.

According to a first aspect, the object is achieved by a method of testing radio equipment. The method includes receiving, by way of a radio channel test apparatus, a baseband signal representing I/Q data of one or more radio channels. The method further includes processing, by way of the radio channel test apparatus, the baseband signal representing I/Q data according to one or more radio channel models. The method further includes transmitting, by way of the radio channel test apparatus, the processed baseband data representing I/Q data to a radio equipment under test.

According to a second aspect, the object is achieved by a radio channel test apparatus operative to perform any one of the method acts of the first aspect.

According to a third aspect, the object is achieved by a radio channel test apparatus including a first interface for receiving a baseband signal including I/Q data. The radio channel test apparatus further includes a processor configured to process the received baseband signal according to one or more radio channel models. The radio channel test apparatus further includes a second interface for transmitting the processed baseband signal.

According to a fourth aspect, the object is achieved by a system including a physical or virtual radio equipment control unit, (e.g., a physical or virtual base band unit), and one or more physical or virtual radio equipment, (e.g., one or more physical or virtual remote radio heads), and a radio channel test apparatus according to the second or third aspect.

BRIEF DESCRIPTION OF DRAWINGS

Examples of embodiments herein will be described in more detail with reference to attached drawings, wherein:

FIG. 3 depicts an illustration of a functional split within a fronthaul network.

FIG. 4a depicts an illustration of multiple possible functional splits within a fronthaul network.

FIG. 4b depicts a table of the functional splits of FIG. 4a also listing the different requirements and advantages.

FIG. 23 depicts an exemplary act according to a method of an eleventh embodiment.

FIG. 24 depicts an exemplary act according to a method of an eleventh embodiment.

FIG. 25 depicts exemplary acts according to a method of a thirteenth embodiment.

FIG. 26 depicts an exemplary act according to a method of a fourteenth embodiment.

FIG. 27 depicts an exemplary act according to a method of a fifteenth embodiment.

DETAILED DESCRIPTION

Figure 1:
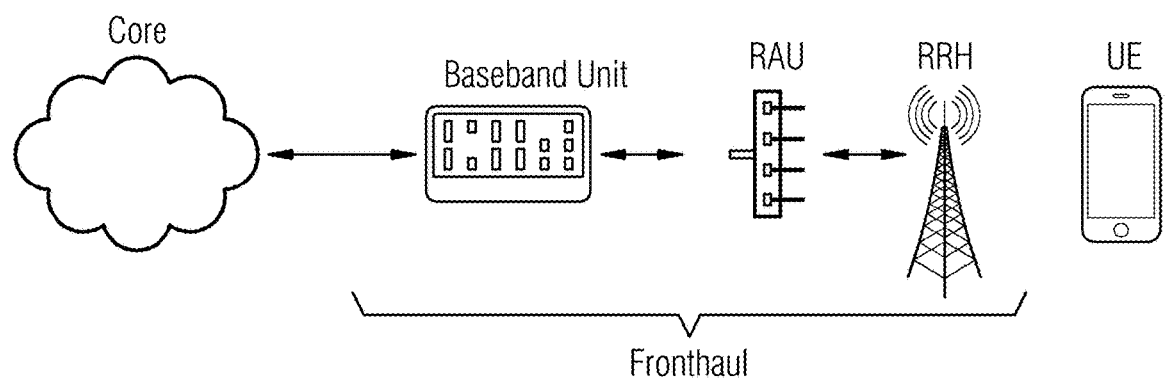
FIG. 1 depicts an illustration of a fronthaul network.

In FIG. 1, a radio communication system is illustrated. The traditional monolithic base transceiver station (BTS) architecture is increasingly being replaced by a distributed BTS architecture in which the functions of the BTS are separated into two physically separate units—a baseband unit (BBU) and a remote radio head (RRH). The BBU performs baseband processing for the particular air interface that is being used to wirelessly communicate over one or more radio frequency channels. The RRH performs radio frequency processing to convert baseband data output from the BBU to radio frequency signals for radiating from one or more antennas coupled to the RRH and/or to produce baseband data for the BBU from radio frequency signals that are received at the RRH via one or more antennas. The RRH may be installed near the one or more antennas, (e.g., at the top of a tower), and the BBU may be installed in a more accessible location, (e.g., at the bottom of the tower). However, as the case may be, RRH and BBU may be collocated, e.g., in a lab. The BBU and the RRH may be connected through one or more fiber optic links. The interface between the BBU and the RRH is defined by fronthaul communication link standards such as the Common Public Radio Interface (CPRI) family of specifications, the Open Base Station Architecture Initiative (OBSAI) family of specifications, and the Open Radio Interface (ORI) family of specifications.

In the 5G architecture, a new frequency domain fronthaul interface will be specified. The frequency domain fronthaul is a functional split where the IFFT/FFT (Inverse Fast Fourier Transform/Fast Fourier Transform) may be moved from the BBU to the RRH. Frequency domain samples instead of time domain samples are sent over the fronthaul. The RRH will have information through a communication channel about the resource allocation for different UEs. The new eCPRI interface specification "eCPRI Specification V1.0 (2017 Aug. 22)" is already available.

For the deployment scenario where the remote radio head, RRH, (sometimes also denoted as Radio Remote Unit, RRU) and the baseband unit, BBU, (sometimes also denoted as radio equipment controller, REC) are separated, the signals received from one or more antennas have to be transported over the media that is connecting the RRH with the BBU as normally the signal combination is done at the BBU. The interface that is used for the connection between the BBU and the RRH may be called the fronthaul. The signals over the fronthaul may be complex time domain samples such as specified in the legacy Common Public Radio Interface, CPRI. Digitized waveforms may be transported over the fronthaul from the BBU to the RRH, and vice versa, via one or more radio aggregation units (RAU).

The user equipment's, UE, signals are power limited and as the path loss varies with the distance to the UE a large dynamic range is encountered when those signals are represented digitally, it may be assumed that for the complex frequency sample a large number of bits will be required and in the case of MIMO (Multiple Input Multiple Output)/diversity layers the required fronthaul capacity will multiply with the number of antennas. Furthermore, it is desired to model such propagation of radio signals in order to test the functionality of the radio system and its components. As the capacity on the fronthaul is limited it is desired to find methods that optimize the usage of the fronthaul.

The BBU may be connected to a core network, Core, and possibly to other BBUs (not shown) via one or more backhaul or crosshaul connections.

Figure 2:
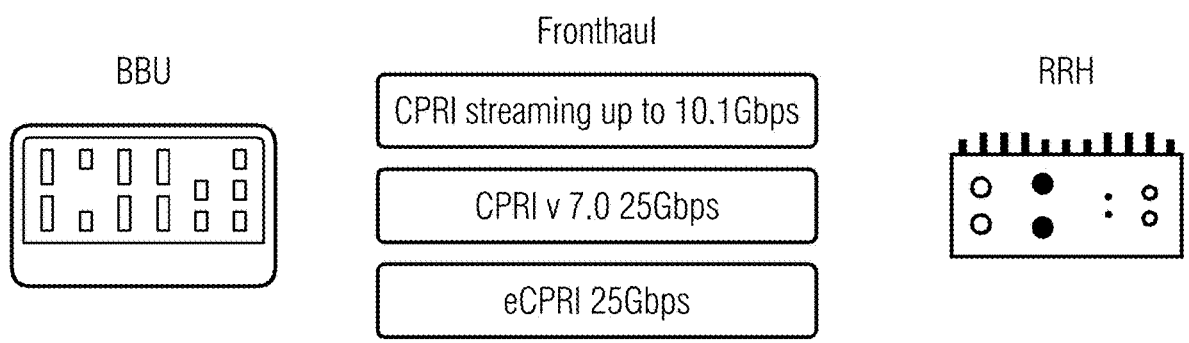
FIG. 2 depicts an illustration of a fronthaul data transmission using different protocols.

In FIG. 2 fronthaul data transmission using different protocols is illustrated. As mentioned, the different protocols employed have different bandwidth capacities. Hence, the CPRI streaming supports up to 10.1 Gbps, whereas CPRI v7.0 supports 25 Gbps, and eCPRI supports up to 25 Gbps, e.g., between the RRH and the BBU.

I/Q data, (i.e., in-phase and quadrature components data), is digitalized air-interface data. The sample rate in 5G is 122.88 MHz. Thus, especially in case of multiple radio channels, a high amount of data needs to be transmitted via the fronthaul. I/Q data transmission may occur in uplink and downlink direction for each radio channel.

In order to improve data transmission, a functional split between the components of the BBU and the RRH may be introduced. Such a functional split is illustrated in FIG. 3. The concept of a functional split is, e.g., described in section 2.3 of eCPRI Specification V1.0 (2017 Aug. 22). According to this, a radio base station is divided into two nodes, one called REC (Radio Equipment Control), e.g., the BBU, and the other called RE (Radio Equipment), e.g., the RRH. The 'Fronthaul Network' may thus be understood as the interface between the REC and RE. The different functions of the base station, e.g., as listed in Table 1 of eCPRI Specification V1.0 (2017 Aug. 22), may be located either in the REC or in the RE, that is to say BBU or RRH, respectively.

Functional split may be summarized as determining how much data is processed in different components, e.g., different parts of an eNodeB/or gNodeB. For example, in CPRI the I/Q data may be in the time domain, but may be in the frequency domain, e.g., when FFT processing is made to I/Q samples. Such processing reduces the amount of data for transmission via the fronthaul link. Data may be processed, e.g., according to one or more radio channel models, in the frequency domain, or data may be transformed to the time domain and processing may be performed in the time domain.

In FIG. 4a, multiple possible functional splits within a fronthaul network are illustrated. FIG. 4a depicts the protocol stack layers for a 3GPP 4G (LTE) or 5G (NR) radio base station. Five inter-layer functional splits numbered A to E are depicted in FIG. 4a. One additional set of intra-PHY splits named {ID;IID;IU} is also shown. More details are described in section 2.3.1 of eCPRI Specification V1.0 (2017 Aug. 22).

In FIG. 4b, a table listing the different requirements and advantages of the functional splits according to FIG. 4a is illustrated. FIG. 4*b* depicts how different splits will set different relative capacity- and latency-requirements on the fronthaul network.

Even though reference is being made to one or more BBUs and one or more RRHs throughout the present disclosure, different names are in use throughout the industry, e.g., for the different parts of a base station. For example, the expression Distributed Unit, DU, and Central Unit, CU, are used for parts equivalent to a RRH and a BBU, respectively, and that the present disclosure also relates those parts.

Figure 5:
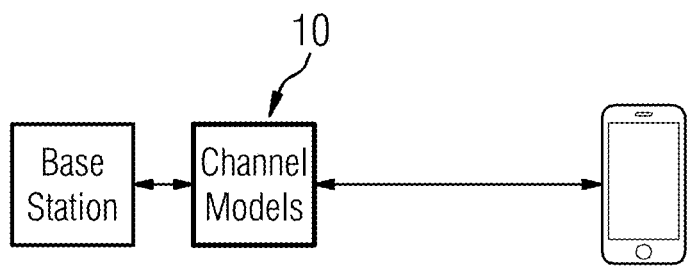
FIG. 5 depicts an illustration of a testing environment.

In FIG. 5, a testing environment for testing radio equipment is illustrated. A channel model is a (test-)model for the behavior of one or more radio signals transmitted over the air interface. This channel model enables to test radio equipment in lab environments or even on-site. Testing may be operationally performed as illustrated in FIG. 5. For example, a channel model test apparatus may be used that performs the processing of the radio frequency signals, e.g., in the form of I/Q data, according to one or more channel models. All connections, e.g., between the base station and/or the test apparatus and/or the UE, may be made by coaxial cables.

Implementation of 5G networks may change the technology landscape for all the concerned stakeholders from equipment manufacturers to telecom operators. Also, the network set-up is becoming more complex. According to 2G, 3G, and 4G testing, channel modeling may be done by connecting multiple mobile phones, also called UEs, to a single antenna via coaxial cable. The move to 5G networks may make this method of testing redundant primarily for two reasons. First of all, new 5G antennas (e.g., employing massive MIMO) do not have an analog coaxial interface. Therefore, new emulators will have to be developed to support the 5G radio equipment, and in particular antenna, testing. Second of all, the number of new antennas needed to provide 5G coverage means that it is not cost effective to test each antenna.

Figure 6:
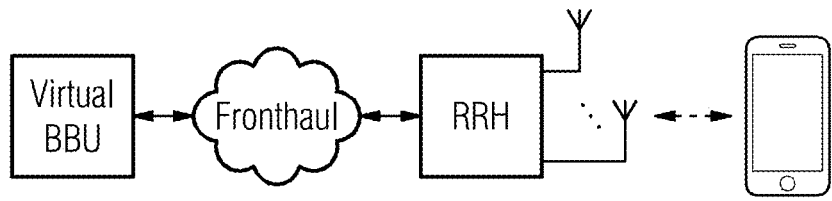
FIG. 6 depicts another illustration of a fronthaul network.

Now turning to FIG. 6, a fronthaul network for the purpose of testing one or more radio equipment is illustrated. The base station is separated into a virtual BBU and a (physical/real) RRH, wherein between the virtual BBU and the RRH a fronthaul network is provided. The RRH may be operatively coupled to the UE in order to transmit and/or receive radio signals.

Figure 7:
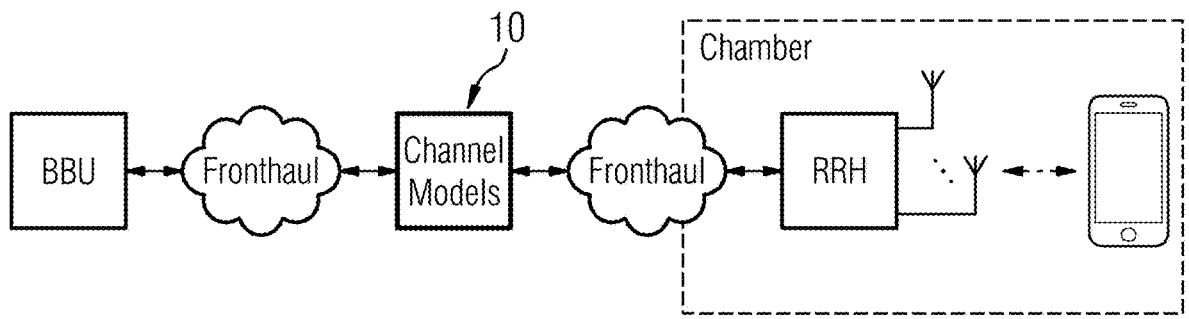
FIG. 7 depicts an illustration of first testing environment including a radio channel test apparatus.

According to FIG. 7, channel modeling is provided for within the fronthaul network. The UE may be collocated with the RRH in a test chamber in which radio signals are exchanged between the RRH and the UE. The channel modeling of the radio signal propagation however is performed in the fronthaul network, e.g., by way of a radio channel test apparatus. That is to say, propagation of radio signals via the air interface according to one or more radio channel models is modeled, e.g., by way of the test apparatus. The test apparatus may be operatively connected to the BBU and the RRH via fronthaul network. That is to say, the test apparatus is inserted in the fronthaul network. Baseband signals representing I/Q data may be exchanged between the RRH and the BBU via the test apparatus. At the same time channel models may be applied to the I/Q data, (e.g., processing the I/Q data) and, thereby modeling the behavior of radio signal propagation between the RRH and the UE.

Figure 8:
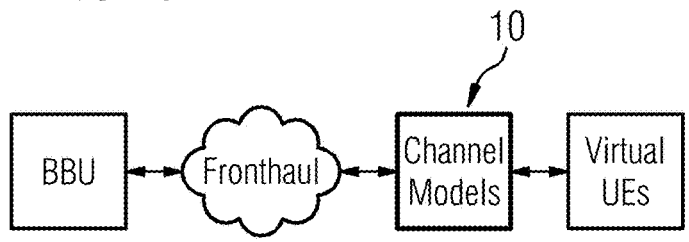
FIG. 8 depicts an illustration of a second testing environment including a radio channel test apparatus.

As illustrated in FIG. 8, instead of a physical RRH, a physical UE, and/or a test chamber a virtual UE may be used as a testing environment. Thereby, the channel models and/or the virtual UE may reflect properties of the propagation of radio signals via the air interface. Such a set-up is particularly applicable in the case of testing a BBU. Virtual or other additional test apparatus may replace real UE and real RRH in this test setup. Alternatively, the virtual UE and virtual RRH and the channel models may be incorporated into a single test apparatus. The test setup of FIG. 8 is thus particularly useful when the implementation of a BBU is to be tested. Also, load testing is possible in this setup.

Figure 9:
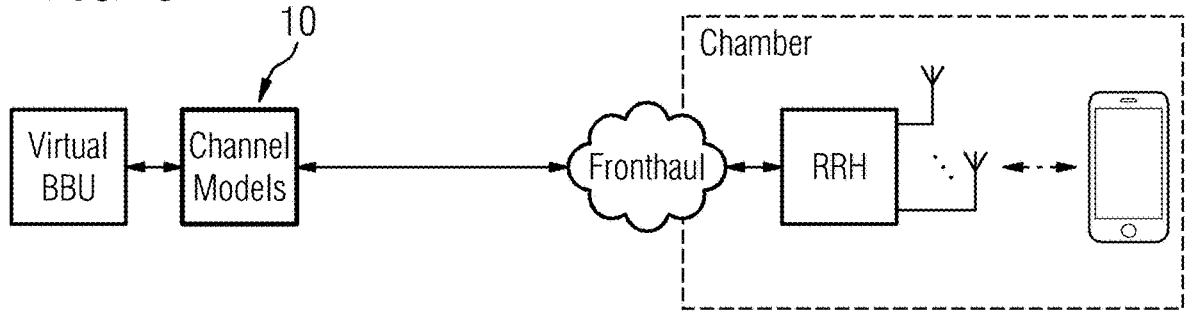
FIG. 9 depicts an illustration of a third testing environment including a radio channel test apparatus.

In FIG. 9 a testing environment including a virtual BBU is used, and the channel modeling is performed via a section of the fronthaul communication link connecting the virtual BBU to the RRH. In this testing environment a physical RRH is collocated with a (e.g., physical) UE in a testing chamber, cf. FIG. 7. The virtual BBU may also emulate core network components, e.g. when a mobile call is made. In this setup, RRH and/or UE may be under test. The digital connection may also be virtual when virtual components (e.g., virtual BBU) is used thereby connecting the virtual BBU to channel models.

Figure 10:
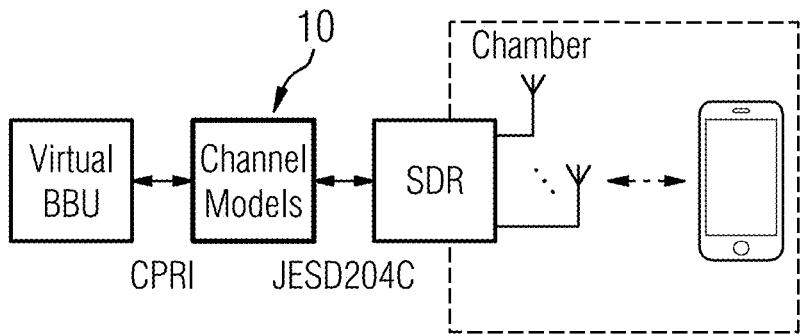
FIG. 10 depicts an illustration of a fourth testing environment including a radio channel test apparatus.

Yet another testing environment is illustrated in FIG. 10. In a UE or an antenna test case, the RRH may be replaced by Software Defined Radio, SDR. The channel model connection protocols may also be different ones, e.g., CPRI and JESD204C. That is to say, instead of the fronthaul channel protocols such as (e)CPRI or JESD204C another protocol may be used for transmitting and/or receiving I/Q data between the radio channel test apparatus and the device under test, e.g., the SDR apparatus. In addition, as may be seen in FIG. 10 for the different sections of the connection between (virtual) BBU and (virtual) RRH, different protocols may be used. In FIG. 10, for example, CPRI is used to connect the radio channel test apparatus to the virtual BBU, whereas the JESD204C protocol is used for communicating with the SDR device.

Figure 11:
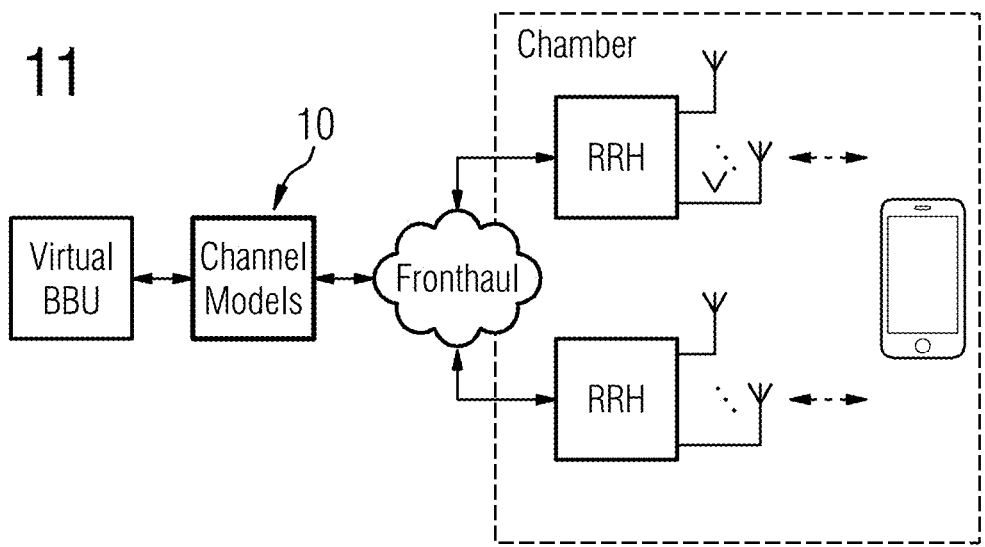
FIG. 11 depicts an illustration of a fifth testing environment including a radio channel test apparatus.

In FIG. 11, a testing environment including multiple RRH which are operatively connected to one or more UEs is illustrated. The multitude of RRHs are connected to the channel modeling (apparatus) via a fronthaul communication network or fronthaul communication link. Again, a virtual BBU as described in the above may be employed. Via CPRI or an alternative digital interface, data from/to multiple antenna and RRH may be transmitted.

Figure 12:
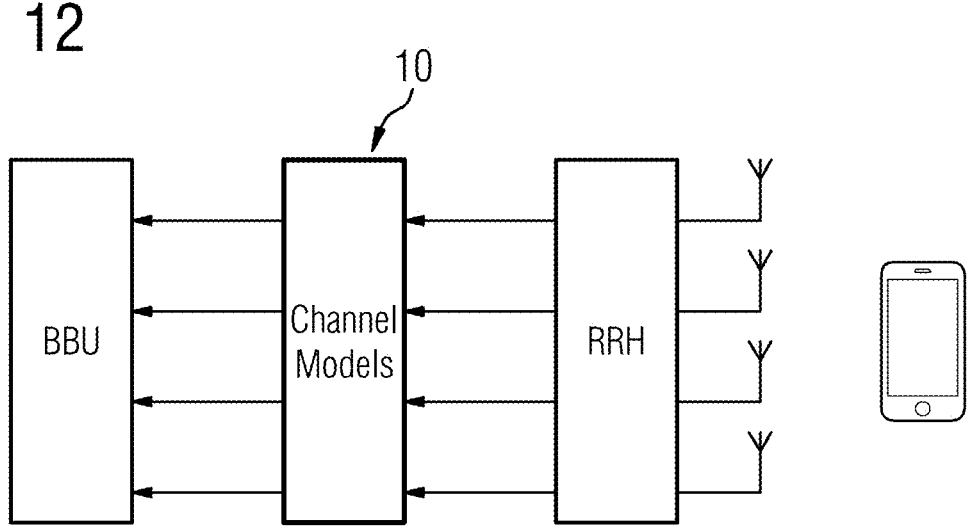
FIG. 12 depicts an illustration of a testing environment including modeling of multiple radio channels.

In FIG. 12, multiple, different channels/data paths are illustrated. Basically, every antenna may have a separate data path/data channel to the BBU in both directions, (e.g., downlink and uplink), although only the uplink data paths are depicted in FIG. 12. Hence, every channel depicted may carry radio channel information relating to one or more radio channels between the RRH and the UE. Each of these channels may thus be processed according to a radio channel model in order to model radio signal propagation. In addition each radio channel may be subject to the same or to (e.g., mutually) different radio channel models. A corresponding radio channel test apparatus will be described in the following.

Figure 13:
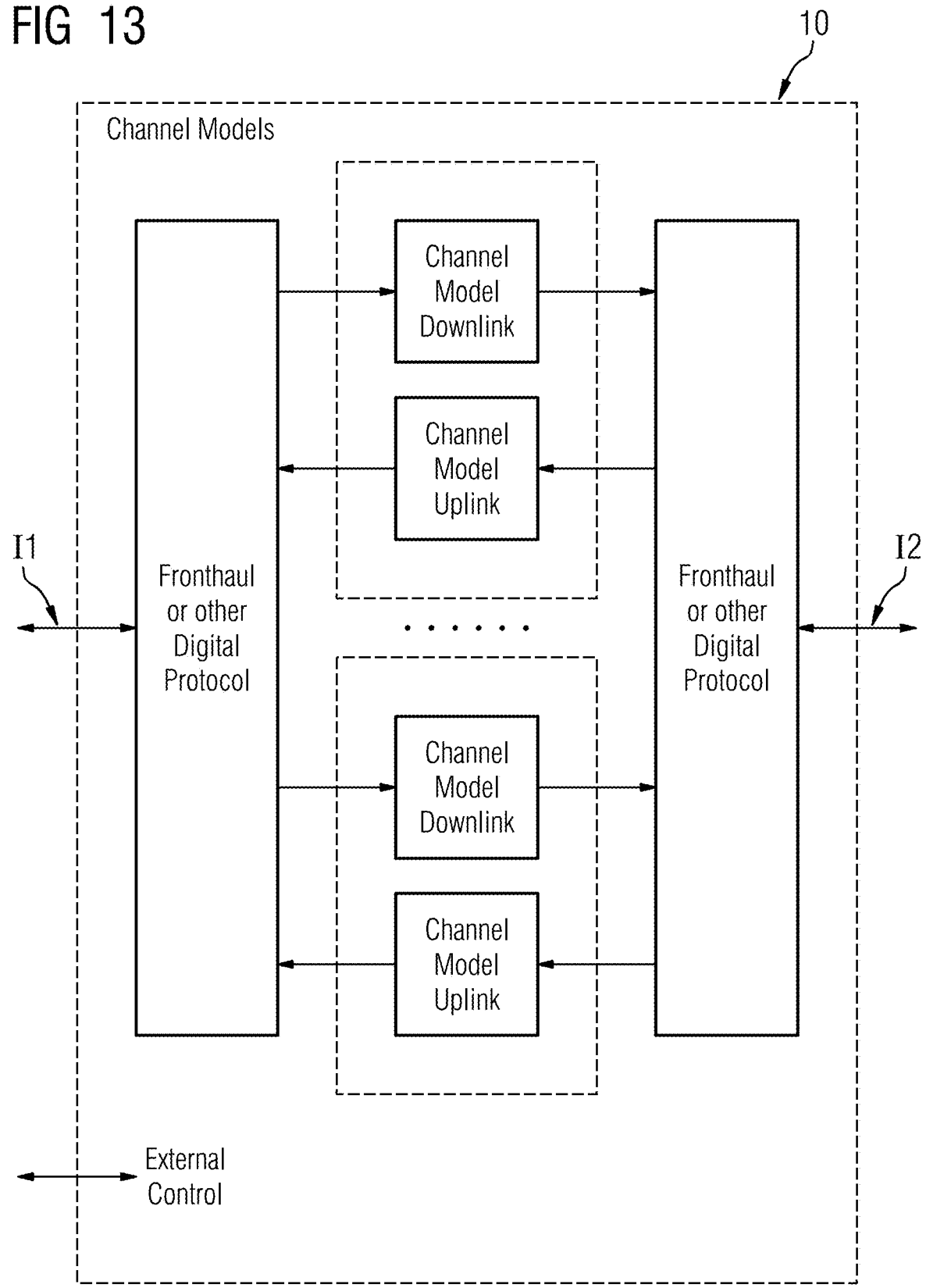
FIG. 13 depicts an illustration of a radio channel test apparatus.

In FIG. 13, a radio channel test apparatus is illustrated. The radio channel test apparatus may include a housing in which one or more of the modules represented by the solid lines in FIG. 13 are arranged. Communication to or from the radio channel test apparatus may be achieved via a first and/or a second fronthaul protocol. Instead of the fronthaul protocol, any other digital protocol may be used in order to transmit and/or receive one or more baseband signals representing I/Q data of one or more radio channels. Thus, the radio channel test apparatus may be communicatively coupled to one or more BBU on one hand and to one or more RRHs on the other hand. To this end, one or more corresponding interfaces may be provided, that implement the respective protocols. The radio channel test apparatus may thus receive data according to a functional split chosen between the BBU and the RRH. The functional split may be chosen according to the predetermined requirements and/or the design chosen by the network operator and/or network equipment manufacturer.

Thus, the radio channel test apparatus may be communicatively coupled to a real/physical or virtual BBU, e.g., as described in any one of the embodiments of FIGS. 1 to 12, via a first interface. On the other hand, the radio channel test apparatus may be communicatively coupled to one or more real/physical RRHs, e.g., as described in any one of the embodiments of FIGS. 1 to 12.

Now, as shown in FIG. 13, by way of a channel model for the uplink and/or the downlink of a respective radio channel, I/Q data received by the radio channel test apparatus (belonging to that radio channel) may be processed according to a radio channel model and subsequently the I/Q data processed according to the channel model may be transmitted by the radio channel test apparatus. That is to say, I/Q data received from one or more RRHs is processed and subsequently transmitted by the radio channel test apparatus to a (virtual) BBU via digital protocol, e.g., a fronthaul protocol. The same is true for the other way around, e.g., in case I/Q data received from a (virtual) BBU is processed and forwarded by the radio channel test apparatus to one or more RRHs. Of course in this case as well, the different testing environments include real/physical RRHs and BBUs, respectively, as described in FIGS. 1 to 12 applies.

As may be seen in FIG. 13, different channel models may be employed for the uplink or downlink of a radio channel. However, the same channel model may be used for uplink or downlink. Furthermore, different channel models may be used for each of a plurality of radio channels. Again, the same channel model may be used for a plurality of radio channels. The one or more channel models employed may be chosen according to the test scenario. That is to say, one or more first channel models may be chosen in order to test a UE, whereas one or more second radio channels may be chosen to test the RRH and/or the BBU.

As illustrated in FIG. 13, I/Q data received via a first interface implementing a fronthaul protocol or another digital protocol may be subject to a channel model, e.g., the I/Q data is processed according to that channel model and the processed I/Q data is forwarded via a second interface implementing a fronthaul protocol or another digital protocol. The I/Q data of multiple radio channels may be received and the I/Q data of each radio channel may be subject to a different channel model. The channel model may reflect information including a multipath profile of the channel, spatial signature of the various paths; fading model; mobility pattern.

By way of a radio channel test apparatus, it is possible to process uplink and downlink I/Q data at the same time. Furthermore, a single FPGA may be used to execute the one or more channel models and process the I/Q data. Furthermore, multiple of the proposed radio channel test apparatus may be combined, e.g., stacked, in order to provide the test setup needed, for example, in case of multiple BBUs, RRH, and/or UEs. Thus, a method for emulating one or more radio channels that may improve the efficiency of testing, eliminate the need for multiple cables, and allow new RF front-end designs to be easily built, is proposed.

According to an aspect of the present disclosure, data and signal processing for testing radio equipment is (e.g., only) performed in the digital domain. That is to say, the channel modeling (e.g., by way of the radio channel test apparatus) is performed according to a functional split in the fronthaul. This means that one or more radio signals received by one or more antennas (or one or more antenna arrays) need to be transformed first into the digital domain, e.g. by way of an Analog-to-Digital converter. Thereafter, the sampled data may be processed digitally, and the one or more channel models may be employed. For example, after sampling the radio signal received by the one or more antennas. The data may be processed according to JESD204C. The JESD204C may be configured as transmit or receive, using either 64B66B or 8B10B line coding, and may be used to realize links requiring more than eight lanes.

Thus, received radio signals may be digitally processed by a digital front end (DFE) processor, e.g., with a programmable receive signal processing path for each receive antenna. Each receive signal path is formed, e.g., with a receive signal processor and an associated serialized interface and RF transceiver/receive front end that is connected to a receive antenna or even multiple antennas. The receive signal processor may include one or more processors (e.g., vector processors) and associated memory (e.g., RAM) for performing receive signal processing on I/Q data samples received from the front end over a receive interface, e.g., one of the JESD receive interface. To facilitate transfer of received signal information between the receiver front end and DFE, the transceiver/receiver front end may include a serialized interface (e.g., JESD204B TX 261) for transfer to the received signal information over I/Q data signal lines. At the DFE, the signal information is received at a corresponding serialized interface (e.g., JESD204B RX). Once receive signal processing of the signals received over I/Q signal lines is completed, the receive signal processor may send the processed samples to the baseband modem, e.g., as by using an (e)CPRI interface module. In this way, separate receive signal paths may be formed for each of the receive antennas. Such a setup is, for example, described in U.S. Pat. No. 8,964,791 B2.

Now, testing of radio equipment may include testing a base station according to 3GPP TS 36.104 V15.3.0 (2018 June). Of course other radio equipment may be tested by way of the testing environment proposed and as described in the above, e.g. the device under test may be a UE. In particular, 3GPP TS 36.104 V15.3.0 (2018 June) provides inter alia an interference model among others in Table 8.2.6-1. Still further test parameters for testing proper functioning of radio equipment is provided throughout the specification of 3GPP TS 36.104 V15.3.0 (2018 June), in particular, in Annex B of 3GPP TS 36.104 V15.3.0 (2018 June). This allows for testing components of the RRH, such as antennas. Hence, the channel model may include the interferer model as described in B.6 of 3GPP TS 36.104 V15.3.0 (2018 June) and the I/Q data received (by the radio channel test apparatus) may be processed as if such inter-cell interfering UE transmissions occurred.

In another embodiment, the functional split in the downlink may be different than the functional split in the uplink.

Furthermore, the configuration of the radio channel test apparatus, (e.g., selection of the radio channels to be processed and/or selection of the one or more channel models), may be way of an external control. The radio channel test apparatus may include an additional interface, as shown in FIG. 13, for receiving corresponding user input.

Figure 14:
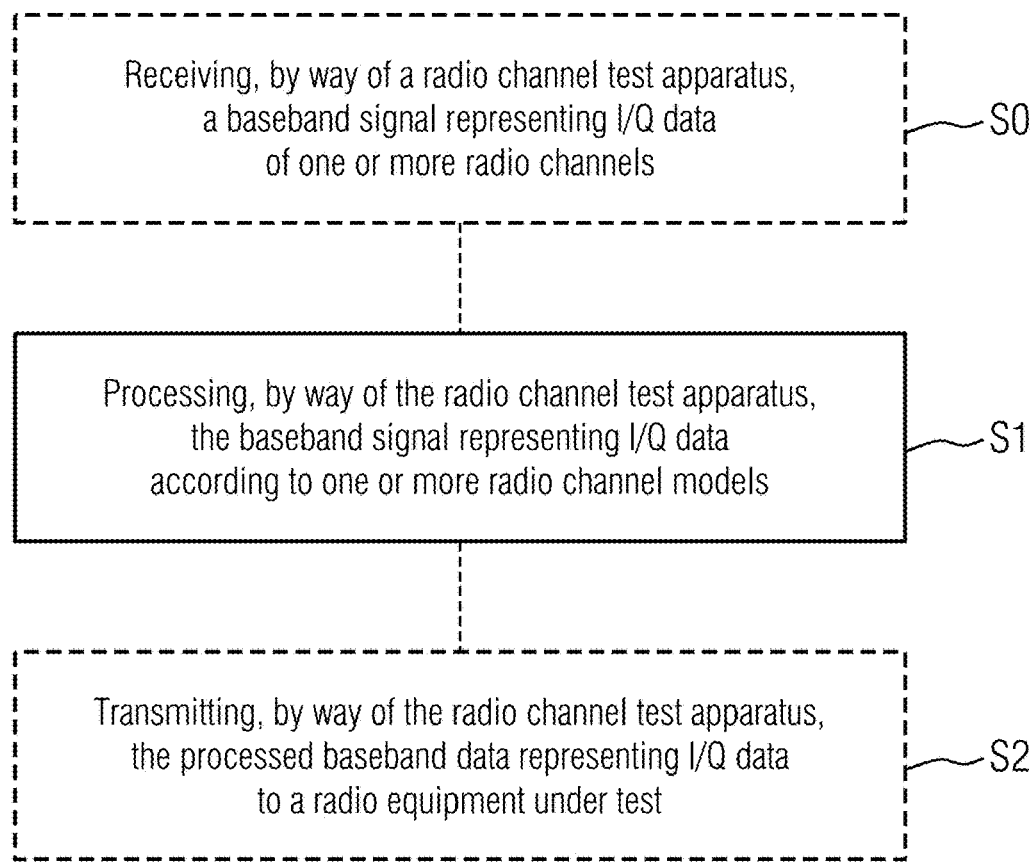
FIG. 14 depicts exemplary acts according to a method of a first embodiment.

In FIG. 14, exemplary method acts according to an aspect of the present disclosure are illustrated. As explained in the above channel modeling is performed by processing I/Q data of one or more radio channels. Thus, in act S0, a baseband signal representing I/Q data of one or more radio channels is received by way of a radio channel test apparatus. The I/Q data may be received from a RRH and/or a BBU, for example, depending on the test environment. Reception of I/Q data may occur via one or more interfaces implementing a digital protocol such as JESD204C and/or (e)CPRI. The protocol employed may depend on the functional split between the BBU and the RRH.

In act S1, the baseband signal received representing I/Q data may be processed according to one or more radio channel models by way of the radio channel test apparatus. As explained in the above, in particular in connection with FIG. 13, radio signal propagation may be subject to fading, interference or the like. Other test parameters by way of which proper functioning of radio equipment may be tested have also been provide in the above, e.g., Table 8.2.6-1 of 3GPP TS 36.104 V15.3.0 (2018 June).

After applying the channel model to the I/Q data, the processed baseband data representing I/Q data is transmitting, by way of the radio channel test apparatus, to a radio equipment under test. As the case may be this may be a RRH, a BBU, and/or a UE or any combination thereof. Such transmission occurs using further radio equipment such as a radio aggregation unit, RAU.

Figure 15:
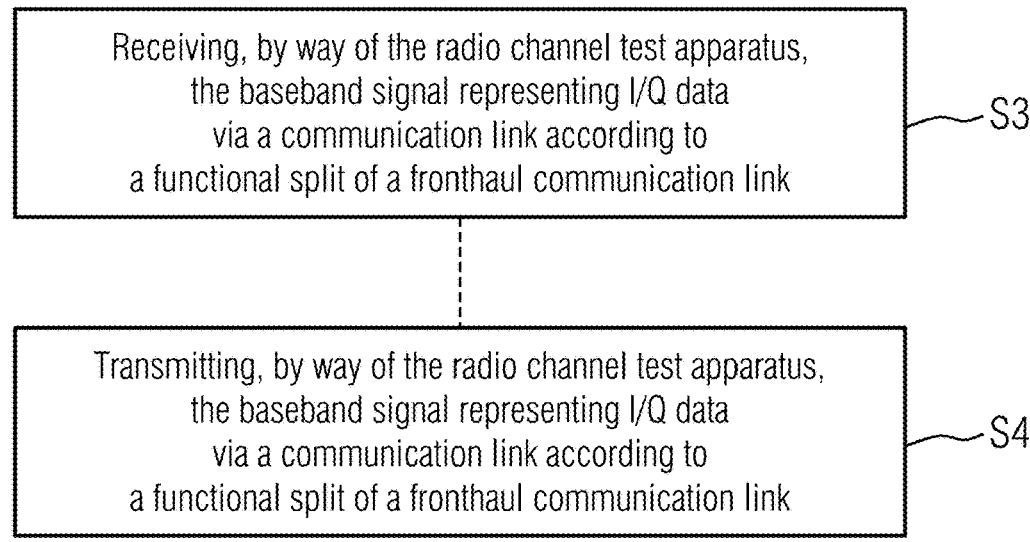
FIG. 15 depicts exemplary acts according to a method of a second embodiment.

In FIG. 15, further exemplary method acts are illustrated. In act S3, the baseband signal representing I/Q data is received, by way of the radio channel test apparatus, via a communication link according to a functional split of a fronthaul communication link. Functional split refers to fronthaul transport network, e.g., according to eCPRI Specification V1.0 (2017 Aug. 22), e.g., internal interface of radio base stations. Thus radio channel test apparatus is operationally arranged between the BBU and the RRH, or to use the terms of eCPRI Specification V1.0 (2017 Aug. 22), between the eREC and the eRE.

However, the baseband signal representing I/Q data may be received via another digital protocol in the same data path as the fronthaul network. That is to say, the baseband signal representing I/Q data may be received via an interface implementing the JESD204C protocol or another interface of the digital front end, DFE.

In act S4, the baseband signal representing I/Q data is transmitted, by way of the radio channel test apparatus, via a communication link according to a functional split of a fronthaul communication link. The functional split according to which the baseband signal representing I/Q data is transmitted may correspond to the functional split according to which baseband signal representing I/Q data is received. Alternatively, the radio channel test apparatus may itself perform certain processing in addition to applying one or more channel models to the baseband signal representing I/Q data. Thus, for example, a baseband signal representing I/Q data is received at functional split B but is transmitted according to functional split E, cf. FIGS. 4a and 4b. The radio channel test apparatus may thus, e.g., perform the acts of RLC, MAC, and (at least in part) PHY.

Figure 16:
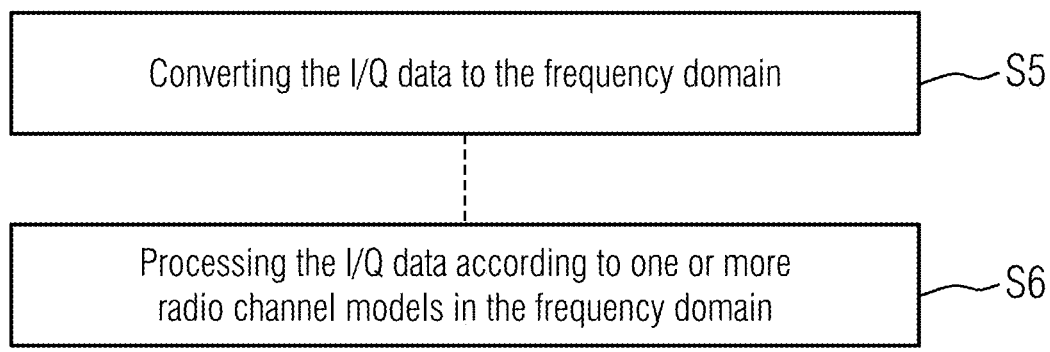
FIG. 16 depicts exemplary acts according to a method of a third embodiment.

In FIG. 16, further exemplary acts are illustrated. In act S5, the I/Q data is converted into the frequency domain. For example, (e)CPRI or another digital protocol based on carrying time domain baseband IQ samples between RRH and BBU may be used.

One of the major objectives of a functional split between RRH and BBU or other eREC and eRE is to lower the bit rates on the fronthaul interface. When looking at the different processing stages performed in the PHY-layer (cf. FIG. 32, eCPRI Specification V1.0 (2017 Aug. 22)) in downlink direction, three processes will mostly increase the bit rate. These three processes are modulation, the port-expansion being done in combination with the beam-forming process and the IFFT+cyclic-prefix-process, (e.g., going from the frequency domain to the time domain), wherein IFFT refers to Inverse Fast Fourier Transformation. By moving the split upwards (into the direction of the MAC layer) the fronthaul bit rate will be lowered and vice versa. In particular, split $II_D$ and $I_U$ as described in eCPRI Specification V1.0 (2017 Aug. 22) may be used in connection with the other aspects and embodiments described herein.

The I/Q data is, (e.g., in CPRI), in the time domain, but in some cases, the I/Q data may be in frequency domain, e.g., when FFT processing is made to I/Q samples. It reduces the data amount for transmission. The I/Q data may thus be modified in the frequency domain or change data to time domain and make processing in there.

One or more IQ sample pairs (I, Q), also referred to as I/Q data, may be in frequency domain or time domain and may include associated control information. Frequency domain I/Q data or time domain I/Q data may depend on the selected functional split, e.g., between RRH and BBU and/or other eCPRI nodes, and in particular may be vendor specific.

The bit width of an I/Q sample, the number of I/Q samples in a message, and the format of I/Q samples (e.g., fixed point, floating point, block floating point), etc. may also be vendor specific and the participating one or more transmit/receive BBUs and RRHs or other eCPRI nodes need to know the actual format in advance. In case of time domain functional split, an eCPRI message carries I/Q data. In case of frequency domain functional split, the information associated with an I/Q sample is contained in a set of N packets, e.g., frequency domain I/Q data for one OFDM symbol and optionally related control information or user data for one OFDM symbol and as the case may be related control information. The conversion of the I/Q data may take place by transforming the I/Q data from the time domain into the frequency domain, and more particularly, the conversion may take place in the uplink direction.

Subsequent to the conversion of the I/Q data into the frequency domain one or more channel models may be applied to the I/Q data. Hence, the I/Q data is processed in the frequency domain in act S6.

Figure 17:
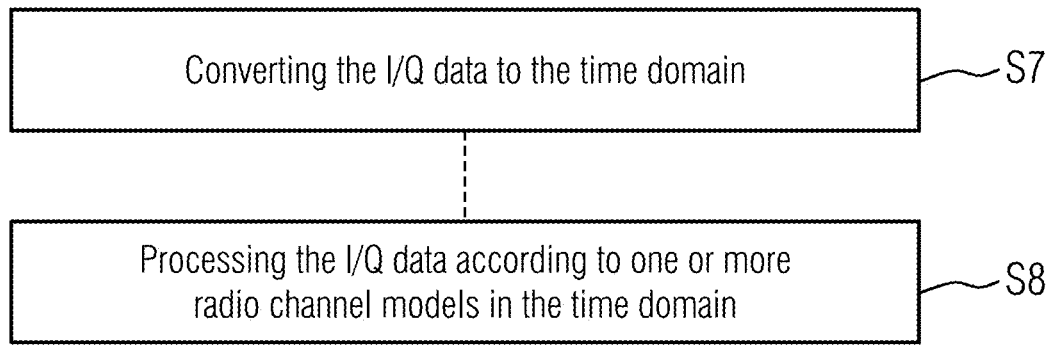
FIG. 17 depicts exemplary acts according to a method of a fourth embodiment.

Now turning to FIG. 17, further exemplary acts are illustrated. In act S7, the I/Q data is converted into the time domain. Thus, for example I/Q data may be received in the downlink via fronthaul connection or a fronthaul protocol such as (e)CPRI. For transmission or for modeling transmission via the air interface, the I/Q data in the time domain is, (e.g., in the downlink direction), converted into the frequency domain.

Hence, the RF signal received may be sampled and I/Q data in the time domain may be produced. This time domain I/Q data is then converted, e.g., by way of a FFT (module) into the frequency domain. In the frequency domain mapping of the I/Q data to OFDM-QAM symbols or other modulation scheme may be made. Subsequently resource mapping may be done and finally frames may be composed. When a RF is to be transmitted the acts outline in this paragraph are executed in reverse order.

In the downstream direction, the data from the MAC layer is processed to form PHY frames and mapped to OFDM resource locations, which are then converted to frequency domain QAM I/Q symbols based on the modulation and coding schemes. The QAM I/Q symbols are then IFFT transformed to obtain the complex time domain samples. These time domain samples are then converted to an analog RF signal for transmission.

Hence, channel modeling takes place in the time domain, by converting I/Q samples from the frequency domain into the time domain. The time domain I/Q data is then processed in act S8 according to the one or more radio channel models.

Figure 18:
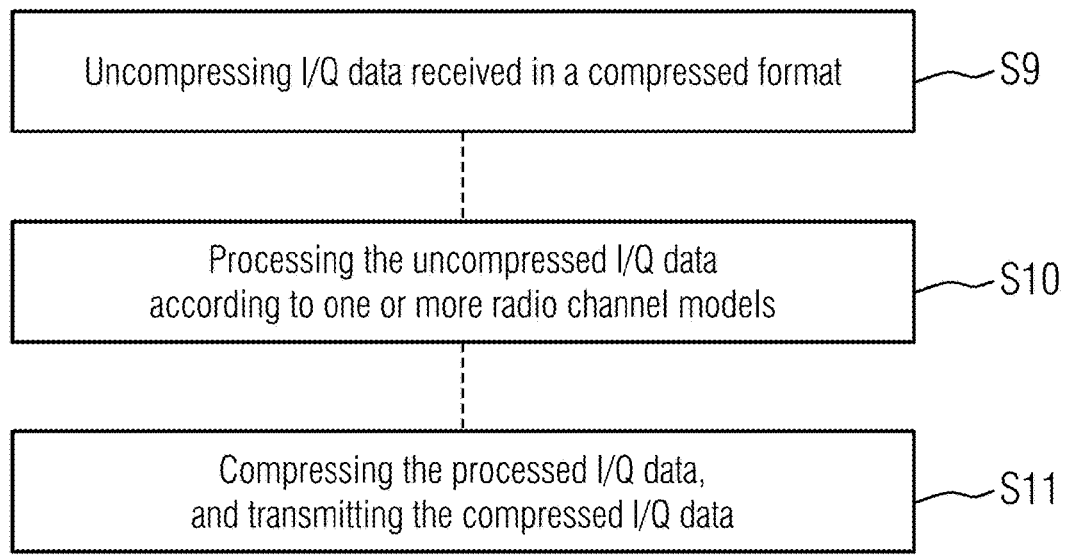
FIG. 18 depicts exemplary acts according to a method of a sixth embodiment.

In FIG. 18, further exemplary method acts are illustrated. I/Q data, either in the time or frequency domain may be transmitted in a compressed form in order to save resources of the fronthaul network. Hence, in act S9, the I/Q data received in a compressed format is uncompressed. In subsequent act S10, the uncompressed I/Q data is processed according to one or more radio channel models. After the processing, the I/Q data according to the one or more channel models, the processed I/Q data may be compressed again in act S11 and transmitted in subsequent act S12, e.g., over the fronthaul communication link according to a functional split. Acts S9, S10, and S11 are applicable for downlink and/or uplink transmission.

Figure 19:
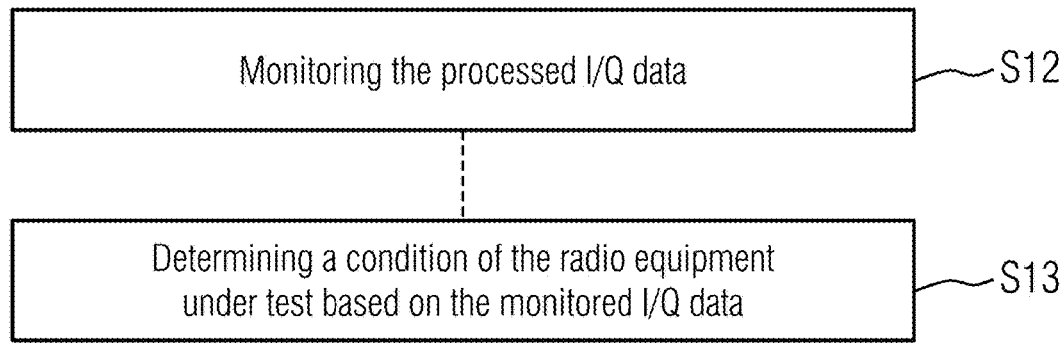
FIG. 19 depicts exemplary acts according to a method of a seventh embodiment.

In FIG. 19, further exemplary acts are illustrated. In act S12, the I/Q data may be monitored, e.g., with respect to the time (mis)alignment of the I/Q data. Furthermore the I/Q data resulting after the being processed according to one or more channel models may be monitored, e.g., by analyzing the resulting RF signal, e.g., by way of a spectrum analyzer.

Based on the monitoring, a condition of the radio equipment under test may be determined in act S13. Acts S12 and S13 may be performed, for example, after act S10 of FIG. 18. For example, the time misalignment of in-phase/quadrature (I/Q) data may be monitored. By monitoring I/Q data signal and interference analysis may be performed. Modulation testing may be performed, e.g., in the downlink direction, based on I/Q data to verify correct BBU operation, CPRI levels, and compliance of the digital signal with the RRH capability. Because user equipment (UE) has much lower transmit power compared to an RRH, interference has the biggest system impact in the uplink. The uplink is also susceptible to interference from passive intermodulation (PIM). PIM detection and distance to PIM source may all be readily analyzed in the digital domain using I/Q data. Furthermore, the I/Q data (before and/or after processing according to one or more channel models) and/or the corresponding spectrum may be displayed and/or one or more threshold may be set in order to perform a diagnostic analysis and issue one or more alarms if desired. Hence, monitoring and analysis of the interference of user equipment in the uplink, as well as the radio's signal analysis in the downlink is enabled in addition to applying the one or more channel models to the one or more radio channels. Furthermore, signal quality may be assessed.

Figure 20:
FIG. 20 depicts an exemplary act according to a method of an eighth embodiment.

In FIG. 20, another exemplary method act is illustrated. In act S14, propagation of radio signals of one or more radio channels via an air interface is modeled by way of the radio channel test apparatus. A radio channel may be modeled according to one or more mathematical functions describing the propagation of radio waves. The channel models may include and/or be based on a recorded impulse responses and may include a model of a physical propagation environment. This modeling may further include processing the I/Q data according to the one or more channel models, e.g., according to act S1. The act of modeling may also include the act of storing or retrieving the corresponding radio channel model from a memory. The memory may for example be located within the radio channel test apparatus. The modeling, (e.g., the one or more channel models), may furthermore include parameters regarding coherence time, coherence bandwidth, delay spread, and/or angular spread.

Figure 21:
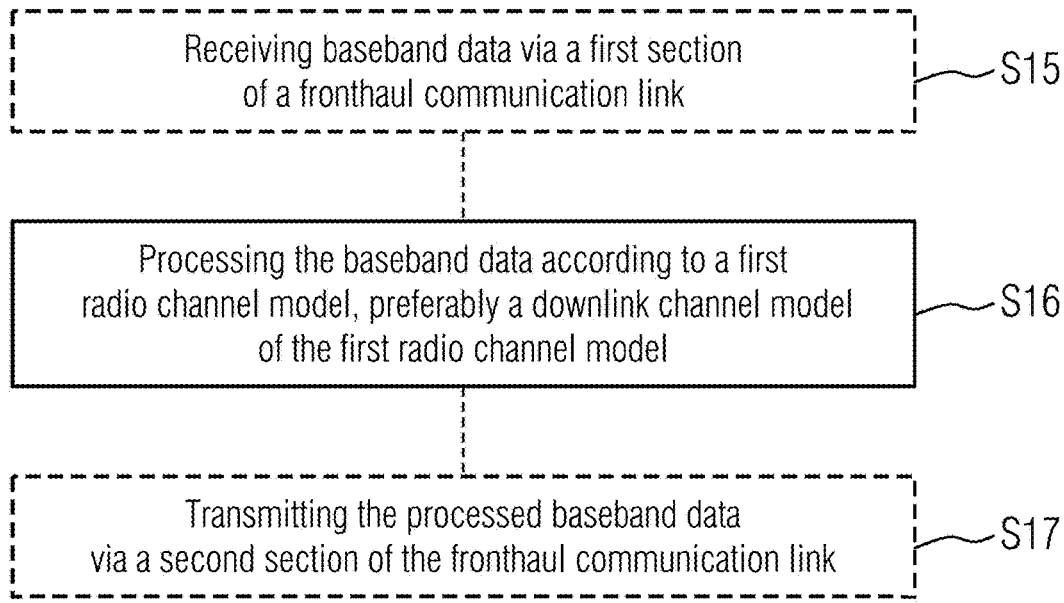
FIG. 21 depicts exemplary acts according to a method of a ninth embodiment.

In FIG. 21, further exemplary acts S15, S16, and S17 are illustrated. Thus, in act S15, baseband data is received, (e.g., by the radio channel test apparatus), via a first section of the fronthaul communication link. The first section connecting the radio channel test apparatus to the BBU or the RRH, respectively, as the case may be. Subsequently, in act S16, the baseband data is processed according to a first radio channel model, e.g., a downlink channel model of the first radio channel model. In optional subsequent act S17, the processed baseband data is transmitted via a second section of the fronthaul communication link. The second section of the fronthaul communication link connecting the radio channel test apparatus to the RRH or the BBU, respectively, as the case may be. The first and/or second section of the fronthaul communication link may correspond to one of the functional splits as described with respect to the embodiment in the above.

Figure 22:
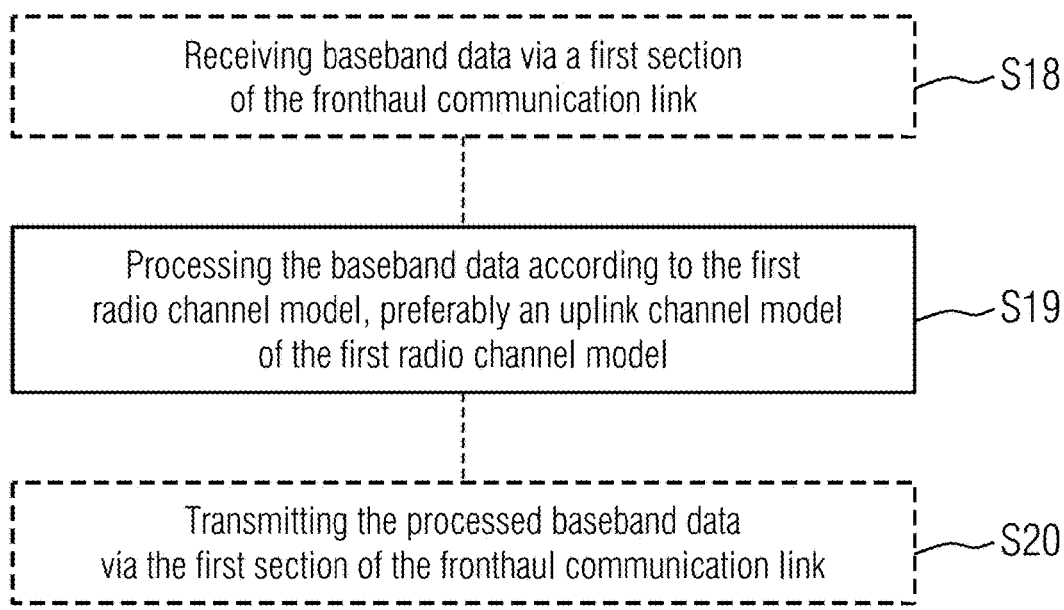
FIG. 22 depicts exemplary acts according to a method of a tenth embodiment.

In FIG. 22, still further exemplary acts S18, S19, and S20 are illustrated. Here, in act S18, baseband data is received, (e.g., by way of the radio channel test apparatus), via the second section of the fronthaul communication link. The second section may correspond to the one mentioned in accordance with FIG. 22. In act S19, the baseband data may be processed according to the first radio channel model, e.g., an uplink channel model of the first radio channel model. Hence, in this case, the same radio channel model for uplink and downlink transmission. However, in act S19, a channel model different to the one used in act S16 may be used. After processing the baseband data, which may be in the form of I/Q data, the processed baseband data may be transmitted via the first section of the fronthaul communication link. Thus, the scenario described in FIG. 22 may correspond to an uplink data transmission, whereas the scenario described in FIG. 23 may correspond to a downlink data transmission, or vice versa.

In FIG. 23, a further exemplary act S21 is illustrated. The baseband data received via the first section and received via the second section of the fronthaul link may be processed, by way of the radio channel test apparatus, in parallel or in a cascaded manner. That is to say, uplink or downlink data may be processed at (e.g., approximately) the same time, e.g., by one or more processors operative to perform digital processing. For example, one or more FPGAs may be used for this purpose. Furthermore, those one or more processors may be arranged in one or more radio channel test apparatus. The multiple radio channel test apparatus may be operationally arranged in parallel in order to process the baseband signal(s) at (e.g., approximately) the same time or may be operationally arranged in a consecutive order in order to process the baseband data in a cascaded manner.

In particular, the baseband data, (e.g., in the form of I/Q data), belonging to a first group of radio channels may be processed by way of a first radio channel test apparatus, whereas the baseband data belonging to a second group of radio channels may be processed by way of a second radio channel test apparatus operationally arranged in parallel or in consecutive order to one another.

Thus, the I/Q data may take the form of baseband data and may be processed according to one or more channel models (for the respective one or more radio channels) as described in connection with FIG. 21. In addition, a first radio channel test apparatus may be used for processing uplink data whereas a second radio channel test apparatus may be used for processing downlink data.

In FIG. 24, another exemplary method act 22 is illustrated. According to act 22, the radio channel test apparatus may be operated in a fronthaul communication link between a physical or virtual radio equipment control and one or more physical or virtual radio equipment. As described in connection with the embodiments of FIGS. 1 to 13, the radio channel test apparatus may be employed in different test environments. Those test environments include real, physical equipment and virtual, emulated radio equipment. Thus, a test environment may include a physical or a virtual radio equipment control, such as one or more physical or virtual BBU. The test environment may further include one or more physical or virtual radio equipment, such as one or more physical or virtual RRH. The radio channel test apparatus may then be operationally arranged between the physical or virtual radio equipment control and one or more physical or virtual radio equipment in order to process the baseband data, (e.g., I/Q data), transmitted between the physical or virtual radio equipment control and physical or virtual radio equipment.

In FIG. 25, further exemplary acts 23 and 24 are illustrated. According to act 23, the baseband signal includes I/Q data of each of multiple radio channels which are processed, by way of the radio channel test apparatus, according to a radio channel model associated with each of the radio channels. One or more radio channels may be subject to the same channel model. However, different radio channel model may be employed for different radio channels. For example, as described above, a first group of radio channels may be subject to processing according to a first channel model, whereas a second group may be subject to processing according to a second radio channel model. Furthermore, different channel model may be used when processing the baseband signal by way of multiple radio channel test apparatus.

In subsequent act S24, the processed baseband signal including I/Q data may be transmitted, by way of the radio channel test apparatus, a the fronthaul communication link.

Now turning to FIG. 26, another exemplary act S25 is illustrated. Here, as already described in connection with act S21 of FIG. 23, the baseband data of each of the multiple radio channels is processed in parallel or in a cascaded manner, by way of the radio channel test apparatus. To this end, one or more processors may be arranged in a radio channel test apparatus. Each of the processors operative to process the baseband data of one or more radio channels assigned for processing by a respective processor.

Finally, in FIG. 27, another exemplary method act S26 is illustrated. According to act 26, baseband signal including I/Q data of each of the multiple radio channels, is processed, by way of the radio channel test apparatus. In such a case, the radio channel test apparatus includes consecutively interconnected devices for processing the baseband signal including I/Q data of the multiple radio channels, wherein each device processes baseband signal of at least one radio channel. That is to say, the radio channel test apparatus may itself include multiple device for processing the I/Q data of the one or more radio channels.

Any acts described herein are merely illustrative of certain embodiments. It is not required that all embodiments incorporate all the acts disclosed nor that the acts be performed in the exact order depicted or described herein. Furthermore, some embodiments may include acts not illustrated or described herein, including acts inherent to one or more of the acts disclosed herein. Any appropriate acts, methods, or functions may be performed through a computer program product that may, for example, be executed by the components and equipment illustrated in the figure above. For example, a memory, (e.g., of the radio channel test apparatus), may include computer readable devices, modules, or components on which a computer program may be stored. The computer program may include instructions which cause one or more processors and any operatively coupled entities and devices, to execute methods according to embodiments described herein. The computer program and/or computer program product may thus provide devices, modules, or components for performing any acts herein disclosed. Any appropriate acts, methods, or functions may be performed through one or more functional modules. Each functional module may include software, computer programs, sub-routines, libraries, source code, or any other form of executable instructions that are executed by, for example, a processor. In some embodiments, each functional module may be implemented in hardware and/or in software. For example, one or more or all functional modules may be implemented by one or more processors, possibly in cooperation with a memory. Processors and memory thus may be arranged to allow processors to fetch instructions from the memory and execute the fetched instructions to allow the respective functional module to perform any acts or functions disclosed herein.

Certain aspects of the aspects disclosed have mainly been described above with reference to a few embodiments. However, as is readily appreciated by a person skilled in the art, embodiments other than the ones disclosed above are equally possible and within the scope of the disclosure. Similarly, while a number of different combinations have been discussed, all possible combinations have not been disclosed. One skilled in the art would appreciate that other combinations exist and are within the scope of the disclosure. Moreover, as is understood by the skilled person, the herein disclosed embodiments are as such applicable also to other standards and communication systems and any feature from a particular figure disclosed in connection with other features may be applicable to any other figure and or combined with different features.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method of testing radio equipment, the method comprising:
 receiving, by way of a radio channel test apparatus, baseband data representing in-phase and quadrature components (I/Q) data of one or more radio channels via a first section of a fronthaul communication link;
 processing, by way of the radio channel test apparatus, the baseband data representing I/Q data received via the first section of the fronthaul communication link according to a downlink channel model of a first radio channel;
 transmitting, by way of the radio channel test apparatus, the processed baseband data representing the I/Q data to a radio equipment under test data via a second section of the fronthaul communication link;
 receiving, by the radio channel test apparatus, baseband data via the second section of the fronthaul communication link;
 processing, by the radio channel test apparatus, the baseband data received via the second section of the fronthaul communication link according to an uplink channel model of the first radio channel; and transmitting, by the radio channel test apparatus, the processed baseband data via the first section of the fronthaul communication link.

2. The method of claim 1, wherein the radio equipment under test is a base band unit, one or more remote radio heads, one or more terminal devices, or a combination thereof.

3. The method of claim 1, further comprising:
receiving, by way of the radio channel test apparatus, the baseband data representing the I/Q data via a communication link according to a functional split of the fronthaul communication link; and/or
transmitting, by way of the radio channel test apparatus, the baseband data representing the I/Q data via the communication link according to the functional split of the fronthaul communication link.

4. The method of claim 1, further comprising:
receiving, by way of the radio channel test apparatus, the baseband data via the fronthaul communication link; and/or
transmitting, by way of the radio channel test apparatus, the baseband data via the fronthaul communication link,
wherein the I/Q data received via the fronthaul communication link represents time domain I/Q data or frequency domain I/Q data.

5. The method of claim 4, further comprising:
converting the I/Q data from the time domain I/Q data to the frequency domain I/Q data; and
processing the I/Q data according to one or more radio channel models in a frequency domain.

6. The method of claim 4, further comprising:
converting the I/Q data from the frequency domain I/Q data to the time domain I/Q data, and
processing the I/Q data according to one or more radio channel models in a time domain.

7. The method of claim 1, further comprising:
uncompressing the I/Q data received in a compressed format;
processing the uncompressed I/Q data according to one or more radio channel models; and/or
compressing the processed I/Q data; and
transmitting the compressed I/Q data.

8. The method of claim 7, further comprising:
monitoring the processed I/Q data; and
determining a condition of the radio equipment under test based on the monitored I/Q data.

9. The method of claim 1, further comprising:
modeling, by way of the radio channel test apparatus, propagation of radio signals of one or more radio channels via an air interface.

10. The method of claim 1, wherein the baseband data of the first section of the fronthaul communication link is encoded according to a first protocol (CPRI),
wherein the baseband data of the second section of the fronthaul communication link is encoded according to a second protocol, and
wherein the second protocol is a different protocol than the first protocol.

11. The method of claim 1, further comprising:
processing, by way of the radio channel test apparatus, the baseband data received via the first section and the baseband data received via the second section of the fronthaul communication link in parallel or in a cascaded manner,
wherein the baseband data received via the first and the second section relates to a same radio channel.

12. The method of claim 1, further comprising:
operating the radio channel test apparatus in the fronthaul communication link between a physical or virtual radio equipment control, and at least one physical or virtual radio equipment.

13. The method of claim 1, wherein the baseband data comprises I/Q data relating to multiple radio channels, and wherein the method further comprises:
processing, by way of the radio channel test apparatus, the baseband data comprising the I/Q data of each radio channel of the multiple radio channels according to a radio channel model associated with each radio channel of the multiple radio channels; and
transmitting, by way of the radio channel test apparatus, the processed baseband data comprising the I/Q data via the fronthaul communication link.

14. The method of claim 13, further comprising:
processing, by way of the radio channel test apparatus, the baseband data of each radio channel of the multiple radio channels in parallel or in a cascaded manner.

15. The method of claim 14, further comprising:
processing, by way of the radio channel test apparatus, baseband data comprising the I/Q data of each radio channel of the multiple radio channels,
wherein the radio channel test apparatus comprises consecutively interconnected devices for processing the baseband data comprising the I/Q data of the multiple radio channels, and
wherein each device processes baseband data of at least one radio channel of the multiple radio channels.

16. The method of claim 12, wherein the physical or virtual radio equipment control is a physical or virtual base band unit, and
wherein the at least one physical or virtual radio equipment is at least one physical or virtual remote radio head.

17. A radio channel test apparatus comprising:
a first interface for receiving baseband data comprising in-phase and quadrature components (I/Q) data via a first section of a fronthaul communication link;
a processor configured to process the received baseband data received via the first section of the fronthaul communication link according to a downlink channel model of a first radio channel; and
a second interface for transmitting the processed baseband data via a second section of the fronthaul communication link,
wherein the second interface is further configured to receive baseband data via the second section of the fronthaul communication link,
wherein the processor is further configured to process the baseband data received via the second section according to an uplink channel model of the first radio channel, and
wherein the first interface is further configured to transmit the processed baseband data via the first section of the fronthaul communication link.

18. A system comprising:
a physical or virtual radio equipment controls;
at least one physical or virtual radio equipment; and
a radio channel test apparatus comprising:
a first interface for receiving baseband data comprising in-phase and quadrature components (I/Q) data via a first section of a fronthaul communication link;
a processor configured to process the received baseband data received via the first section of the fronthaul communication link according to a downlink channel model of a first radio channel; and a second interface for transmitting the processed baseband data via a second section of the fronthaul communication link, wherein the second interface is further configured to receive baseband data via the second section of the fronthaul communication link, wherein the processor is further configured to process the baseband data received via the second section according to an uplink channel model of the first radio channel, and wherein the first interface is further configured to transmit the processed baseband data via the first section of the fronthaul communication link.

19. The system of claim 18, wherein the physical or virtual radio equipment control is a physical or virtual base band unit, and wherein the at least one physical or virtual radio equipment is at least one physical or virtual remote radio head.

* * * * *